United States Patent
Freeman et al.

(10) Patent No.: US 10,752,106 B1
(45) Date of Patent: Aug. 25, 2020

(54) SNORKEL SLIDE-IN ATTACHMENT TO VEHICLE BODY MEMBER

(71) Applicant: Toyota Motor North America, Inc., Plano, TX (US)

(72) Inventors: Stephen E. Freeman, McKinney, TX (US); Jakin C. Wilson, Prosper, TX (US); Jack Ferguson, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/398,674

(22) Filed: Apr. 30, 2019

(51) Int. Cl.
*B60K 13/02* (2006.01)
*F02M 35/16* (2006.01)
*F02M 35/10* (2006.01)
*B62D 65/16* (2006.01)

(52) U.S. Cl.
CPC .............. *B60K 13/02* (2013.01); *B62D 65/16* (2013.01); *F02M 35/10144* (2013.01); *F02M 35/16* (2013.01)

(58) Field of Classification Search
CPC ....... F02M 35/10013; F02M 35/10006; F02M 35/10091; F02M 35/161; F02M 35/164; F02M 35/10144; F02M 35/16; B62D 65/16; B60K 13/02
See application file for complete search history.

(56) References Cited

U.S. PATENT DOCUMENTS

| | | | | |
|---|---|---|---|---|
| 4,366,878 | A * | 1/1983 | Warf ...................... | B60K 13/02 180/68.3 |
| 6,379,410 | B1 * | 4/2002 | Dudley .............. | B01D 46/2414 55/385.3 |
| 7,678,168 | B2 * | 3/2010 | Connelly .............. | F16L 55/035 180/309 |
| 8,485,153 | B2 * | 7/2013 | Satarino ........... | F02M 35/10144 123/184.21 |
| 8,960,347 | B2 | 2/2015 | Bennett | |
| 9,234,484 | B2 | 1/2016 | Lewington et al. | |
| 9,683,527 | B2 | 6/2017 | Tallman | |
| 10,131,222 | B1 * | 11/2018 | Tier ....................... | B60K 13/02 |

(Continued)

FOREIGN PATENT DOCUMENTS

| DE | 202008005603 U1 | 9/2009 |
|---|---|---|
| KR | 19980062886 A | 10/1998 |

(Continued)

*Primary Examiner* — Erez Gurari
(74) *Attorney, Agent, or Firm* — Christopher G. Darrow; Darrow Mustafa PC

(57) ABSTRACT

Installation of a snorkel on a vehicle can be facilitated by slide-in attachment configurations. A slot can be defined in a vehicle body member (e.g., a fender). The slot includes an insertion portion and a retention portion. A width of the insertion portion is greater than a width of the retention portion. The snorkel has an inlet end portion and an outlet end portion. The outlet end portion can include a flange. The width of the flange is less than a width of the insertion portion but greater than the width of the retention portion. The outlet end portion can be-initially received in the insertion portion. The snorkel and/or the vehicle body member can be manipulated so that the outlet end portion moves into the retention portion. The outlet end portion can be retainably received therein due to the flange being larger than the width of the retention portion.

10 Claims, 3 Drawing Sheets

(56) References Cited

U.S. PATENT DOCUMENTS

| | | | | |
|---|---|---|---|---|
| 10,293,682 B2 * | 5/2019 | Nagano | ............... | B60K 15/063 |
| 10,393,076 B1 * | 8/2019 | Freeman | ................ | B60K 13/02 |
| 10,428,773 B1 * | 10/2019 | Bennett | ................ | B60K 13/02 |
| 2014/0008136 A1 * | 1/2014 | Bennett | ................ | B60K 13/02 |
| | | | | 180/68.3 |
| 2014/0150384 A1 * | 6/2014 | Bunnell | ............... | B60K 15/063 |
| | | | | 55/332 |
| 2015/0240760 A1 * | 8/2015 | Lewington | ........... | F02M 35/164 |
| | | | | 95/269 |
| 2016/0010604 A1 * | 1/2016 | Zeilenga | ............. | F02M 35/164 |
| | | | | 95/12 |
| 2017/0130681 A1 | 5/2017 | Tallman | | |

FOREIGN PATENT DOCUMENTS

| | | |
|---|---|---|
| KR | 20120053111 A | 5/2012 |
| WO | 2017077213 A1 | 5/2017 |

\* cited by examiner

SNORKEL SLIDE-IN ATTACHMENT TO VEHICLE BODY MEMBER

FIELD

The subject matter described herein relates in general to vehicle air intakes and, more particularly, to vehicle air intakes that use a snorkel.

BACKGROUND

Some automotive vehicles, such as pick-up trucks, may use an air intake snorkel as part of their air intake system. The air intake snorkel generally serves to move the air intake of the vehicle from its common location in the engine compartment under the vehicle hood to a more elevated position, such as on the vehicle hood, A-pillar, or roof. An air intake snorkel may be used when it is desirable to reduce the intake of dust, dirt, mud, or other substances/objects in the external environment, such as when the vehicle is used off road.

SUMMARY

In one respect, the subject matter presented herein is directed to a snorkel system for a vehicle. The vehicle includes a vehicle body member. The vehicle body member can include an inner side and an outer side. A slot can be defined in the vehicle body member. The slot can include an insertion portion and a retention portion. The insertion portion can have a first width. The retention portion can have a second width. The second width can be less than the first width. The snorkel can include a snorkel body that defines a fluid conduit. The snorkel body can include an inlet end portion and an outlet end portion. The outlet end portion of the snorkel can include a flange. The flange can have a width. The width of the flange can be less than the first width but greater than the second width. The outlet end portion of the snorkel body can be retainably received in the retention portion of the slot. In such case, the outlet end portion of the snorkel body can be prevented from being moved along its body axis by an overlap between the flange and the inner side of the vehicle body member.

In another respect, the subject matter presented herein is directed to a method of attaching a snorkel to a vehicle. The vehicle can include a vehicle body member with an inner side and an outer side. A slot can be defined in the vehicle body member. The slot can include an insertion portion and a retention portion. The insertion portion can have a first width. The retention portion can have a second width. The second width can be less than the first width. The snorkel can include a snorkel body that defines a fluid conduit. The snorkel body can include an inlet end portion and an outlet end portion. The outlet end portion of the snorkel can include a flange. The flange can have a width. The width of the flange can be less than the first width but greater than the second width. The method can include bringing the snorkel and the vehicle body member together such that the flange extends beyond the inner side of the vehicle body member. In one implementation, the outlet end portion of the snorkel body can be inserted into the insertion portion of the slot. The method can further include manipulating the snorkel body or the vehicle body member such so that the outlet end portion moves from the insertion portion and into the retention portion of the slot such that the outlet end portion of the snorkel body is retainably received in the retention portion of the slot. Thus, the outlet end portion of the snorkel body can be prevented from being moved along its body axis by an overlap between the flange and the inner side of the vehicle body member.

DETAILED DESCRIPTION

Figure 1:
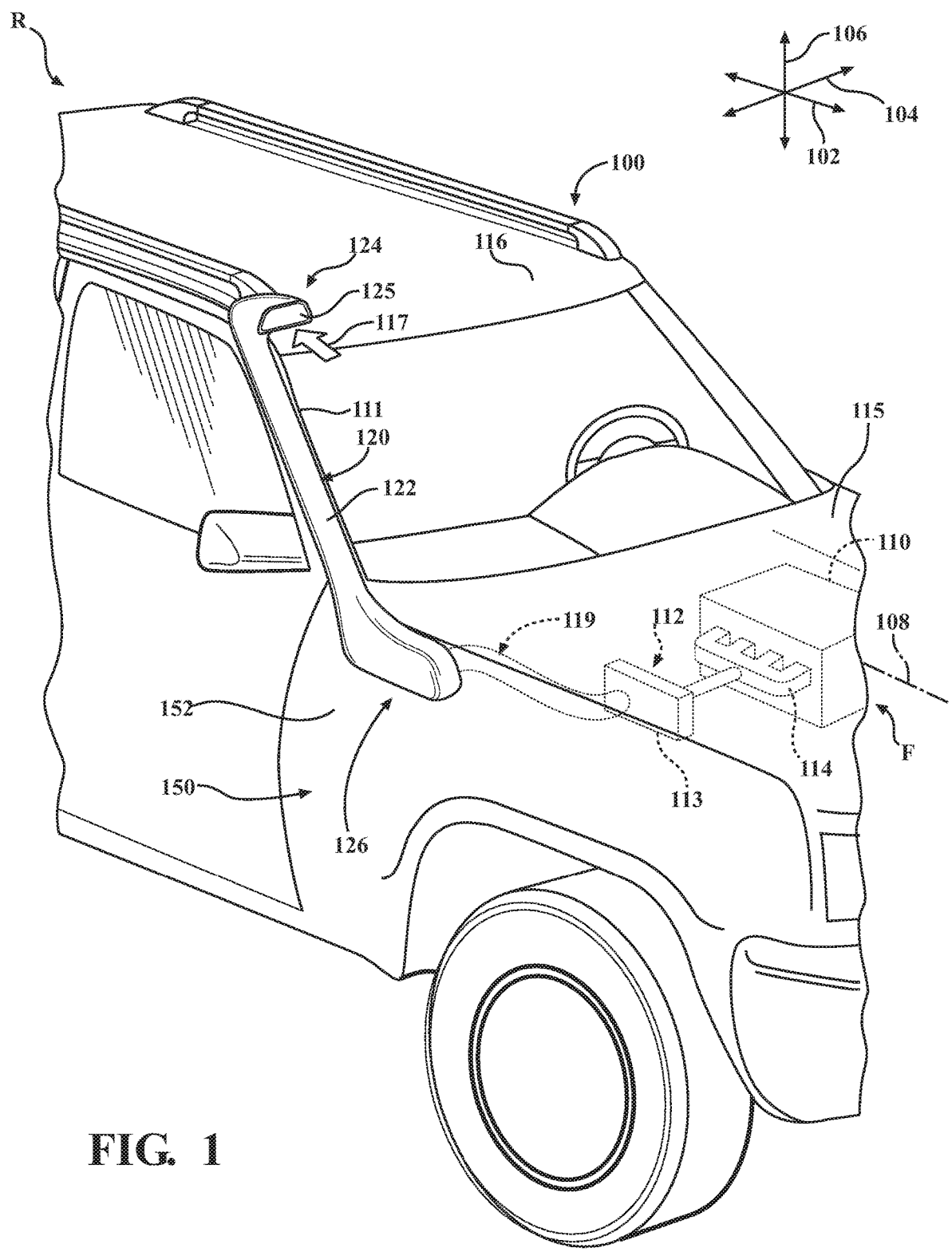
FIG. 1 is an example of a vehicle with a snorkel.

The installation of some snorkels on a vehicle can be difficult due to the location of some of the fasteners for attaching the snorkel to the vehicle. According to arrangements herein, a snorkel and a vehicle body member can be configured to allow the snorkel to slide into an installation position and be partially retained in place by engagement between the snorkel and the vehicle body member. As a result, fewer fasteners are needed to attach the snorkel to the vehicle body member.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a portion of a vehicle 100 with a snorkel 120 is shown. As used herein, "vehicle" means any form of motorized transport. In one or more implementations, the vehicle 100 can be a pick-up truck or a sport utility vehicle. However, it will be understood that embodiments are not limited to pick-up trucks or sport utility vehicles. Indeed, arrangements described herein can be used in connection with any type of land-based vehicle.

The vehicle 100 can include a forward end F and a rearward end R. The vehicle 100 can have an associated longitudinal direction 102. The longitudinal direction 102 can generally correspond to the forward-rearward direction of the vehicle 100. The vehicle 100 can have an associated lateral direction 104, which can be substantially perpendicular to the longitudinal direction 102. The lateral direction 104 can generally correspond to the left-right direction of the vehicle 100. The vehicle 100 can have an associated elevational direction 106. The elevational direction 106 can be substantially perpendicular to the longitudinal direction 102 as well as the lateral direction 104. The elevational direction 106 can generally correspond to the top-bottom direction of the vehicle 100.

The vehicle 100 can include a vehicle body member 150. In one or more arrangements, the vehicle body member 150 can be a fender 152. According to arrangements described herein, the fender 152 can be configured to facilitate attachment of the snorkel 120.

Figure 2:
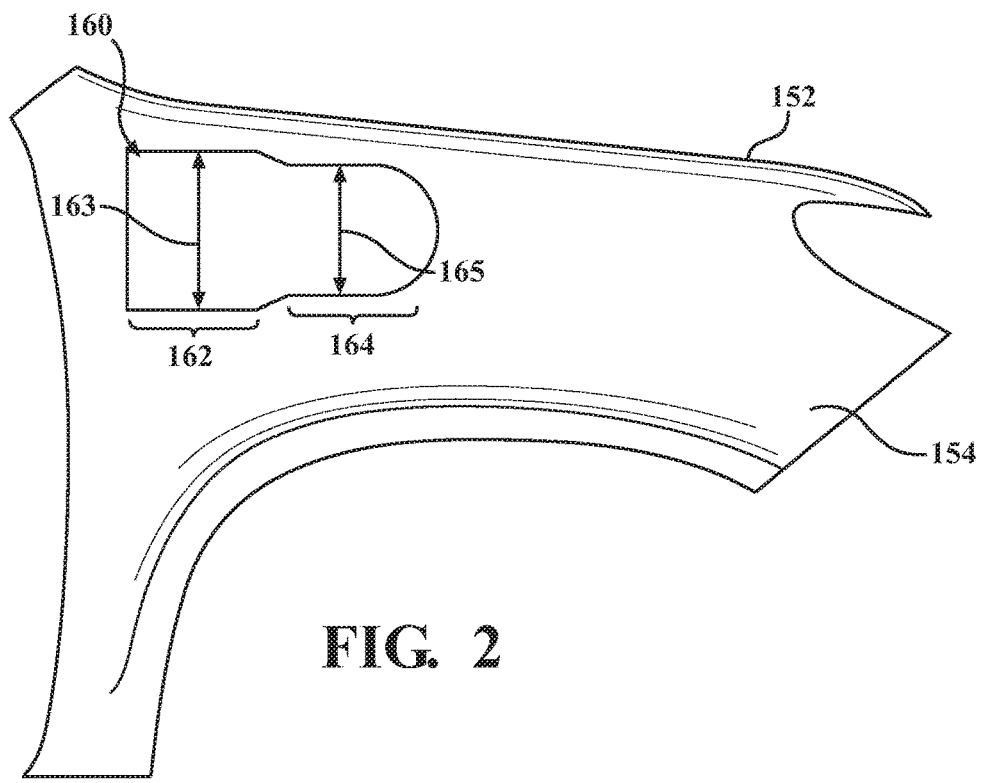
FIG. 2 is an example of a vehicle fender including a slot for snorkel attachment.

One example of a fender 152 configured according to arrangements is shown in FIG. 2. The fender 152 can include an outer side 154 and an inner side 156 (see FIG. 4). It will be appreciated that the terms "inner" and "outer" are used for convenience relative to a central axis 108 (FIG. 1) of the vehicle 100. The fender 152 can be made of any material, such as metal, plastic, or any other material now know or later developed.

In one or more arrangements, a slot 160 can be defined in the fender 152. The slot 160 can be formed in any suitable manner. The slot 160 can extend through the thickness of the fender 152.

The slot 160 can include an insertion portion 162 and a retention portion 164. The insertion portion 162 can be configured to receive a portion of the snorkel 120, and the retention portion can be configured to retainably engage the portion of the snorkel 120, as will be described in greater detail later. The insertion portion 162 can have a width 163. The retention portion 164 having a width 165. The width 165 of the retention portion 164 can be less than the width 163 of the insertion portion 162. The insertion portion 162 can be in communication with the retention portion 164.

The insertion portion 162 and the retention portion 164 can have any suitable configuration. The particular arrangement shown in FIG. 2 is merely a non-limiting example. The insertion portion 162 and the retention portion 164 can have any suitable spatial relationship. In one or more arrangements, the retention portion 164 is located forward of the insertion portion 162 in the longitudinal direction 102 of the vehicle 100. However, other relative locations are possible.

Referring to FIG. 1, the snorkel 120 can include a snorkel body 122 with an inlet end portion 124 and an outlet end portion 126. The snorkel 120 can have any suitable size, shape, and/or configuration to provide a sufficient supply of intake air for an internal combustion engine 110 of the vehicle 100. The snorkel 120 can be formed from any suitable material, including, for example, engineering plastics, metals, and glass fiber or carbon fiber composite materials. In one or more arrangements, the snorkel 120 can be made of polypropylene. The snorkel 120 can be a single piece. Alternatively, the snorkel 120 can be made up of a plurality of components that are operatively connected to each other in any suitable manner.

The inlet end portion 124 can include an intake opening 125. The snorkel body 122 can define a passage 123 (FIG. 4) for routing air 117 received in the intake opening 125 to the outlet end portion 126. From there, air can be routed by one or more ducts 119 or conduits into the air intake system 112 to provide combustion air for the internal combustion engine 110. The outlet end portion 126 of the snorkel 120 can be operatively connected in fluid communication with the duct(s) 119.

In some arrangements, the air intake system 112 can include an intake air box 113, which may hold an air filter. The intake air box 113 can be operatively connected in fluid communication with an intake air manifold 114 of the internal combustion engine 110.

The inlet end portion 124 of the snorkel 120 can be disposed in an elevated position (i.e. above) relative to the portion of the air intake system 112 that is disposed under the hood 115 in the engine compartment of the vehicle 100. In the arrangements shown in FIG. 1, the snorkel 120 can be disposed so that it extends upwardly proximate the passenger side A-pillar 111 and above the roof 116 of the vehicle 100. Alternately, the snorkel 120 may be disposed on or above the hood 115 or in other elevated locations on the vehicle 100. It will be appreciated that one or more portions of the snorkel 120 can be attached to the vehicle 100. For instance, the inlet end portion 124 can be configured for attachment to the hood 115, A-pillar 111, roof 116, or other location using any suitable form of attachment, now known or later developed. The outlet end portion 126 can be attached to the vehicle 100 as will be described herein.

Figure 4:
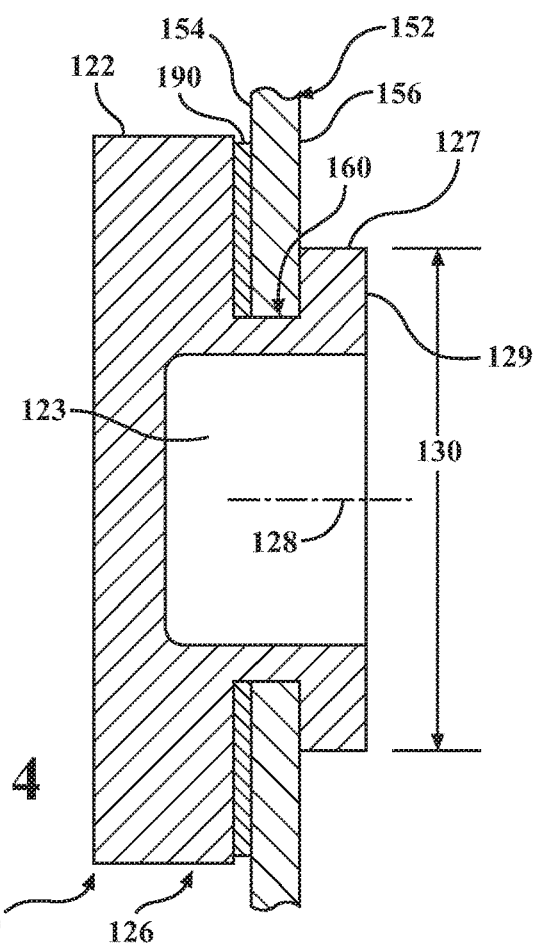
FIG. 4 is a cross-sectional vehicle of an interface between the snorkel and the vehicle fender.

Referring to FIG. 4, the outlet end portion 126 can include an outlet end 129 of the snorkel 120. The outlet end portion 126 can include a flange 127. The flange 127 can have a width 130. The width 130 of the flange 127 can be less than the width 163 of the insertion portion 162 of the slot 160. The width 130 of the flange 127 can be greater than the width 165 of the retention portion 164 of the slot. The outlet end portion 126 of the snorkel 120 can have an axis 128.

Now that the individual components have been described, an example of the installation of the snorkel 120 on the vehicle 100 will now be presented. This description may be applicable to the embodiments described above in relation to FIGS. 1-4, but it is understood that this description can be carried out with other suitable systems and arrangements. Moreover, the following description may include other steps that are not described here, and in fact, the description is not limited to including every step described herein, nor is it limited to the described chronological order. Indeed, some of the steps may be performed in a different order than what is shown and/or at least some of the steps shown can occur simultaneously.

Figure 3A:
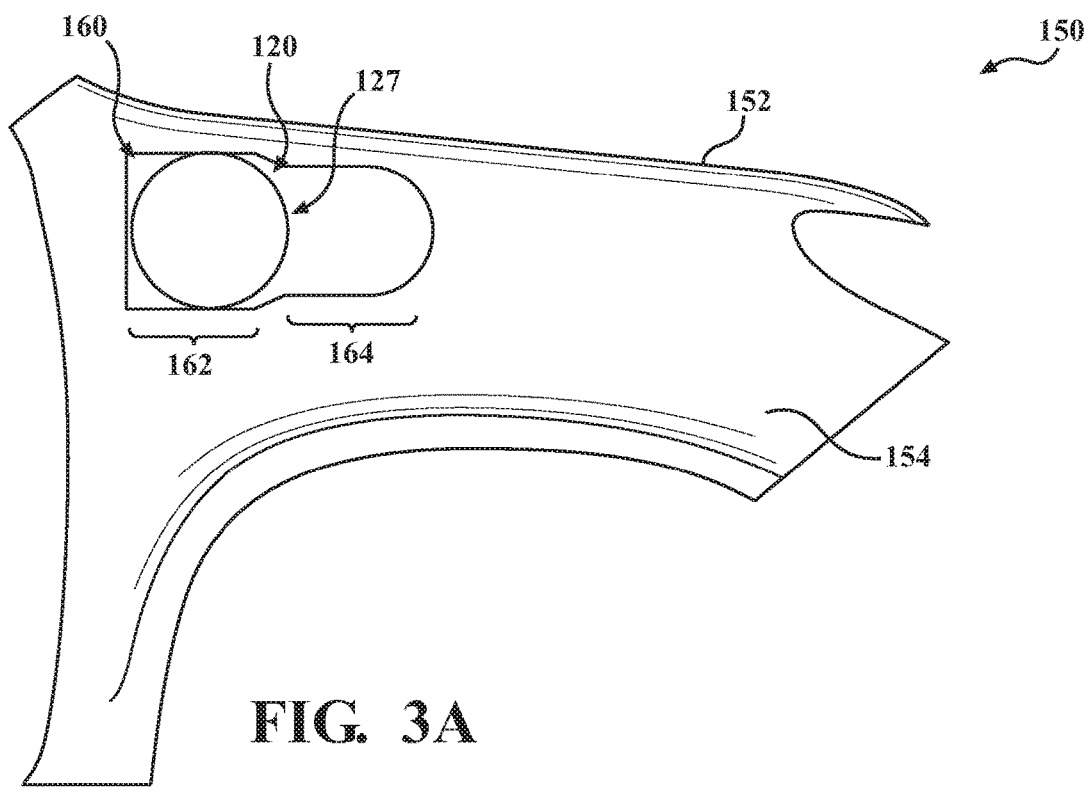
FIG. 3A is a view of the snorkel body received in an insertion portion of the slot.
Figure 3B:
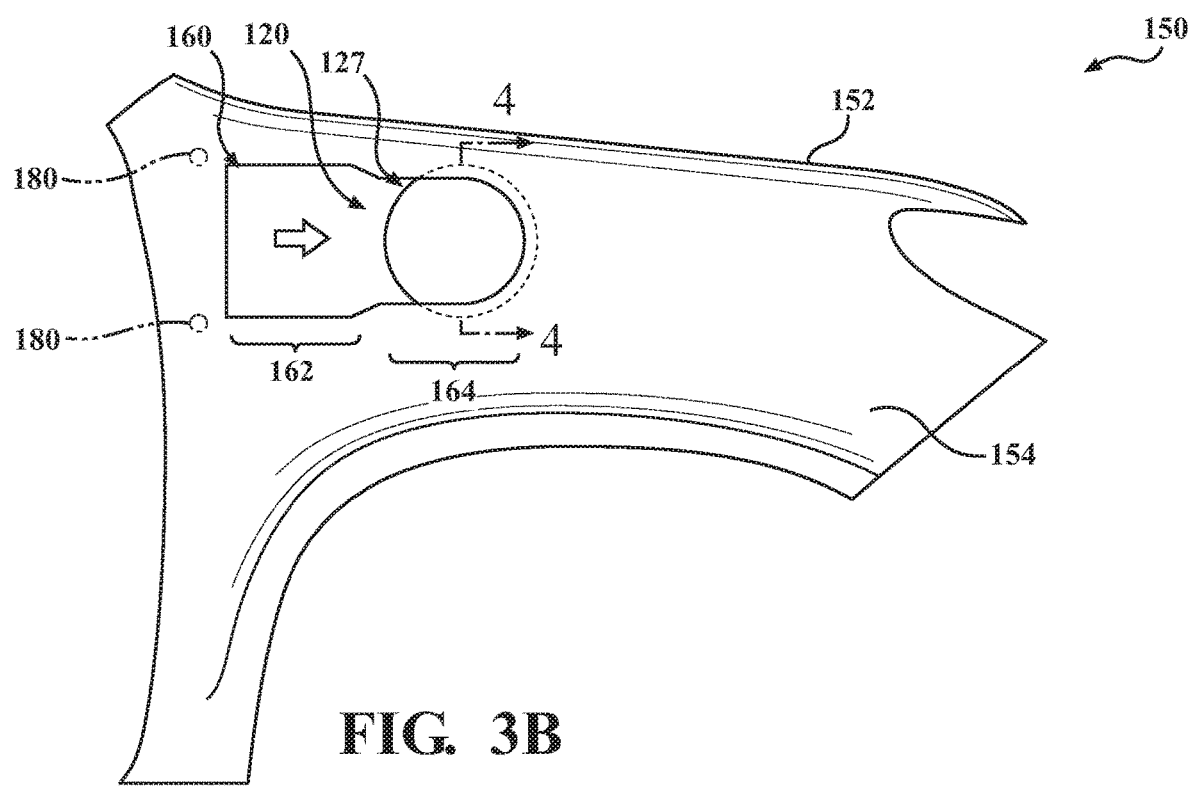
FIG. 3B is a view of the snorkel body received in a retention portion of the slot.

The snorkel 120 and the fender 152 can be brought together so that the outlet end portion 126 is received in the insertion portion 162 of the slot 160, as is shown in FIG. 3A. To facilitate the description, the outlet end portion 126 of the snorkel 120 is represented in FIGS. 3A and 3B by a circle corresponding to the flange 127. It will be appreciated that the flange 127 can have any suitable shape and is not limited to being circular. "Brought together" or "bringing together" means that the snorkel 120 and/or the fender 152 are manipulated. The flange 127 can enter the insertion portion 162 of the slot 160 from the outer side 154 of the fender 152. The flange 127 can extend beyond the inner side 156 of the fender 152.

The snorkel 120 and/or the fender 152 can be manipulated so that the outlet end portion 126 moves from the insertion portion 162 and into the retention portion 164 of the slot 160, as shown in FIG. 3B. For example, the snorkel 120 can be moved so that the outlet end portion 126 slides into the retention portion 164 from the insertion portion 162.

When in the retention portion 164, the outlet end portion 126 can be retainably received in the retention portion 164 of the slot 160. The width 130 of the flange 127 is greater than the width 165 of the retention portion 164. Thus, the outlet end portion 126 is prevented from being pulled out of the slot 160 along its axis 128 due to an overlap between the flange 127 and the inner side 156 of the fender 152.

When in the retention portion 164, the snorkel body 122 can be substantially adjacent to the outer side 154 of the fender 152. In some arrangements, foam 190 can be provided in the space between the snorkel body 122 and the outer side 154 of the fender 152.

When the outlet end portion 126 is retainably received in the retention portion, the snorkel 120 can be further attached to the fender 152 by one or more fasteners 180 (FIG. 3B). For instance, threaded fasteners can be inserted into an aperture in the snorkel 120 and corresponding bores in the fender 152, which may be provided in one or more bosses on the inner side 156 of the fender 152. The fasteners 180 can be any suitable type of fastener, such as a bolt or screw.

In one or more arrangements, the one or more fasteners 180 can be located rearward of the slot 160 in the longitudinal direction 102 of the vehicle 100. Thus, in such case, a forward portion of the outlet end portion 126 can be attached to the fender 152 by the retainable engagement between the outlet end portion 126 and the fender 152, and a rearward portion of the outlet end portion 126 can be attached to the fender 152 by the one or more fasteners 180. In one implementation, the snorkel 120 can be attached to the fender 152 by the retainable engagement between the outlet end portion 126 and the fender 152 and further by two fasteners.

It should be noted that arrangements described herein can be used in connection with various types of vehicle snorkels. For instance, the snorkel 120 can be a snorkel for off-road usage of the vehicle 100. In such case, the snorkel can reduce the intake of dust, dirt, mud, or other substances/objects in the external environment. As another example, the snorkel 120 can be a snorkel for instances in which the vehicle 100 is exposed to water (e.g. when the vehicle is crossing streams, rivers, or other bodies of water) or snow/ice. In such case, the snorkel 120 can avoid the intake of water or other liquids in the external environment.

It will be appreciated that arrangements described herein can provide numerous benefits, including one or more of the benefits mentioned herein. For example, arrangements described herein can facilitate the installation and/or removal of a snorkel from a vehicle. Arrangements described herein can provide a suitable manner of attaching a snorkel on a vehicle. Arrangements described herein can reduce the number of fasteners needed to install a snorkel on a vehicle. The reduction in the number of fasteners can reduce the number of operations needed to install the snorkel. Arrangements described herein avoid the need to access some typically difficult-to-access fasteners by eliminating their usage.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system comprising:
a vehicle including a vehicle body member, the vehicle body member including an inner side and an outer side, a slot being defined in the vehicle body member, the slot including an insertion portion and a retention portion, the insertion portion having a first width, the retention portion having a second width, the second width being less than the first width; and
a snorkel including a snorkel body defining a fluid conduit, the snorkel body including an inlet end portion and an outlet end portion, the outlet end portion of the snorkel including a flange, the flange having a width, the width of the flange being less than the first width but greater than the second width,
the outlet end portion of the snorkel body being retainably received in the retention portion of the slot, whereby the outlet end portion of the snorkel body is prevented from being moving along its body axis by an overlap between the flange and the inner side of the vehicle body member.

2. The system of claim 1, wherein the snorkel body is further attached to the vehicle body member by one or more fasteners.

3. The system of claim 2, wherein the one or more fasteners are located rearward of the slot in a longitudinal direction of the vehicle.

4. The system of claim 1, wherein the retention portion is located forward of the insertion portion in a longitudinal direction of the vehicle.

5. The system of claim 1, wherein the vehicle body member is a fender.

6. The system of claim 1, further including foam disposed between the snorkel body and the outer side of the vehicle body member.

7. A method of attaching a snorkel to a vehicle, the vehicle including a vehicle body member with an inner side and an outer side, a slot being defined in the vehicle body member, the slot including an insertion portion and a retention portion, the insertion portion having a first width, the retention portion having a second width, the second width being less than the first width, the snorkel including a snorkel body defining a fluid conduit, the snorkel body including an inlet end portion and an outlet end portion, the outlet end portion of the snorkel including a flange, the flange having a width, the width of the flange being less than the first width but greater than the second width, the method comprising:
bringing the snorkel and the vehicle body member together such that the outlet end portion of the snorkel body is received in the insertion portion of the slot and such that the flange extends beyond the inner side of the vehicle body member; and manipulating the snorkel or the vehicle body member such that the outlet end portion moves from the insertion portion and into the retention portion and such that the outlet end portion is retainably received in the retention portion, whereby the outlet end portion is prevented from being moving along its body axis by an overlap between the flange of the snorkel body and the inner side of the vehicle body member.

8. The method of claim 7, further including:
attaching the outlet end portion to the vehicle body member by one or more fasteners.

9. The method of claim 8, wherein the one or more fasteners are located rearward of the slot in a longitudinal direction of the vehicle.

10. The method of claim 8, wherein the retention portion is located forward of the insertion portion in a longitudinal direction of the vehicle, and wherein moving the snorkel body includes moving the snorkel body toward a forward end of the vehicle.

* * * * *